United States Patent [19]

Orton et al.

[11] 4,053,928
[45] Oct. 11, 1977

[54] EDGE DETECTION ANALYZER

[75] Inventors: Criley Orton, Ridgecrest, Calif.; Richard G. Bahler, Holyoke, Colo.

[73] Assignee: The United States of America as represented by the Secretary of the Navy, Washington, D.C.

[21] Appl. No.: 708,253

[22] Filed: July 23, 1976

[51] Int. Cl.² ............................................. H04N 7/00
[52] U.S. Cl. ...................................... 358/96; 358/93; 358/107
[58] Field of Search ............................ 358/96, 107, 93

[56] References Cited

U.S. PATENT DOCUMENTS 3,963,866   6/1976   Tanie ........................................ 358/96

Primary Examiner—Richard Murray
Attorney, Agent, or Firm—R. S. Sciascia; Roy Miller

[57] ABSTRACT

A contrast detection analyzer for detecting all edges sensed during a circular scan and their angles with respect to vertical, wherein an edge near the center of the scan is detected, the angle is measured regardless of the light or dark orientation, and the exclusivity of the edge is determined. The analyzer output is in a digitized format suitable for computer calculations.

5 Claims, 3 Drawing Figures

EDGE DETECTION ANALYZER

BACKGROUND OF THE INVENTION

In the field of pattern recognition it is necessary or advantageous in some application to detect the presence of straight lines. In such applications not only is the presence of the line significant, but also its orientation and exclusivity within the field-of-interest, and the contrast level along its edge. One such application is in the military arena wherein the field-of-interest may be a geographical area. Straight lines detected therein identify man-made objects. The present invention not only has such military application but also may be used anywhere that it is desirable to identify straight line signatures. One such other application may be in the medical field wherein the present invention can be employed as a diagnostic tool. This invention must be used in conjunction with a computer to determine the presence of straight lines, corners, or other geometrical configuration.

Typically, a field-of-interest is imaged by an electronic video means. Thereafter, the image is interrogated by any of a number of means, one such means is by systematically scanning the image in discrete steps under the direction of a computer a full raster pattern. The scan may also contain circular components in that at least one small circular scan is conducted at each discrete point along the raster pattern. That is, at, say position $X_6$, $Y_2$, a series of concentric circular scans of a small portion of the entire image is conducted. Then, the computer driven scan is moved to the next discrete point ($X_7$, $Y_2$) and the series of circular scans are again conducted, until each discrete point throughout the entire raster pattern has been interrogated. Thereby, the entire image of the field-of-interest is systematically investigated.

The present invention is designed to be employed in conjunction with a computer driven scanning technique as described above wherein multiple circular scans are taken at each of a plurality of discrete points within the computer raster pattern. The present invention processes the information obtained during the scan at each such discrete point to detect the presence of contrast edges. Each edge occuring within the scan image is sensed, but if more than one edge is detected the information will be rejected. That is, the present invention is interested only in processing one-edge signatures and will reject false information resulting from, such as, noise. The present invention then determines the orientation of the angle of the edge at which the contrast of the image changes. Additionally, circuitry that is disclosed within the specification as a preferred embodiment of the present invention also includes as an option, means for rejecting contrast edges that are too far from the center of the scan circle, since such edges have a greater likelihood of false readings.

DESCRIPTION OF A PREFERRED EMBODIMENT

Figure 1:
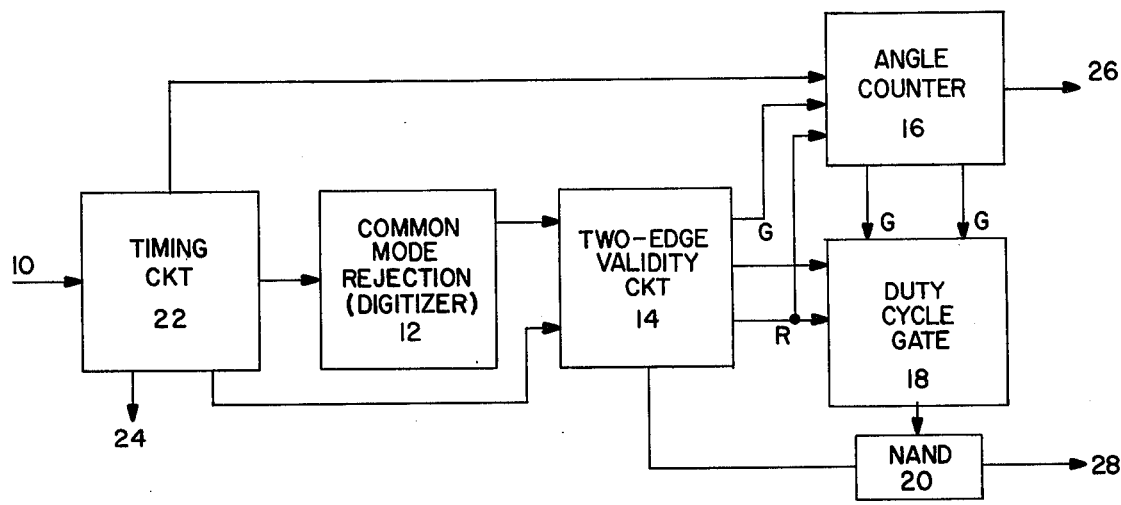
FIG. 1 is a block diagram of the present invention.

FIG. 1 is a block diagram showing the technique of the present invention on an input 10 of video data that is coupled to common mode rejection circuit (CMR) 12 through timing circuit 22. CMR 12 processes the video input to determine whether a contrast edge exists with the circularly scanned portion of the image. CMR 12 may also include a contrast threshold that is adjustable. The threshold provides a level that must be exceeded by the level of contrast before the video can be processed any further.

CMR 12 provides a digitized output of detected video to edge validity circuit 14. Circuit 14 determines if more than one distinct edge exists during the scan revolution. If more than one edge is indicated the information is rejected as being inconsistent with data required for a straight line signature. When it is verified that only a single edge is present, a "valid" signal is coupled from circuit 14 to NAND 20.

Angle counter 16 is initiated at the start of each even scan revolution. Thereby, a reference datum line is established from which the measured angle of the contrast edge can be calculated. When the scan crosses the contrast edge the first time the counter's pace is reduced by one-half. And, when it crosses the edge the second time the then value of the count is available for a computer when it receives a "start read" flag. It identifies the angle of the edge by defining the point on the circumferance of the scan circle that is half-way between the first intersection and the second. Thereby, a single numerical value identifies the angle of orientation of the contrast edge.

Duty cycle gate 18 senses the input pulses to counter 16 and operates to reject edges that are too near the perimeter of the scan. Gate 18 identifies such edges by noting the count difference at the first intersection and the second. If the difference is very small, or excessivly large, an edge near the perimeter of the scan circle is indicated. Gate 18 operates to remove such edges from consideration because they are less reliable as indicators of straight line signatures. Gate 18 accomplishes its function by disabling NAND 20 when an edge is detected too near the perimeter. The disqualifying nearness is selectable within gate 18.

Timing circuit 22 memorizes video input 10 and provides an output of the video information per each discrete point as it is scanned. Circuit 22 also provides timing and command signals to the apparatus that are necessary for proper operation. Output 24 is coupled to device(s) to correlate raster position with the processed information. Counter output 26 is read by the computer when output 28 signals the computer that the count is valid. In accordance with the present invention, the circuit of FIG. 2 includes apparatus for memorizing a video input. In the example shown, the apparatus is scan convertor 30. Once the video information is memorized on the tube of scan converter 30, X-Y enable pulses from an appropriately programmed computer place the scan converter in a read mode, and the scan converter sweep is controlled through scan driver 134 instead of the camera. The circuitry then goes ahead to process the scene memorized in accordance with the objectives of the present invention, as will be discussed below wherein reference should be made to FIGS. 2 and 3.

If a contrast edge exists in any position, the circular scan will produce a pulsed video output whose duty cycle, or proportion of more positive to more negative voltage, depends upon how close the edge is to the center of the circle described in the scan. A two-edged pulse must be produced since the scan starts at a particular part of the scene which is dark, or light, and ends up and the same point after scanning through a lighter, or darker, portion, respectively, of the scene.

Figure 2:
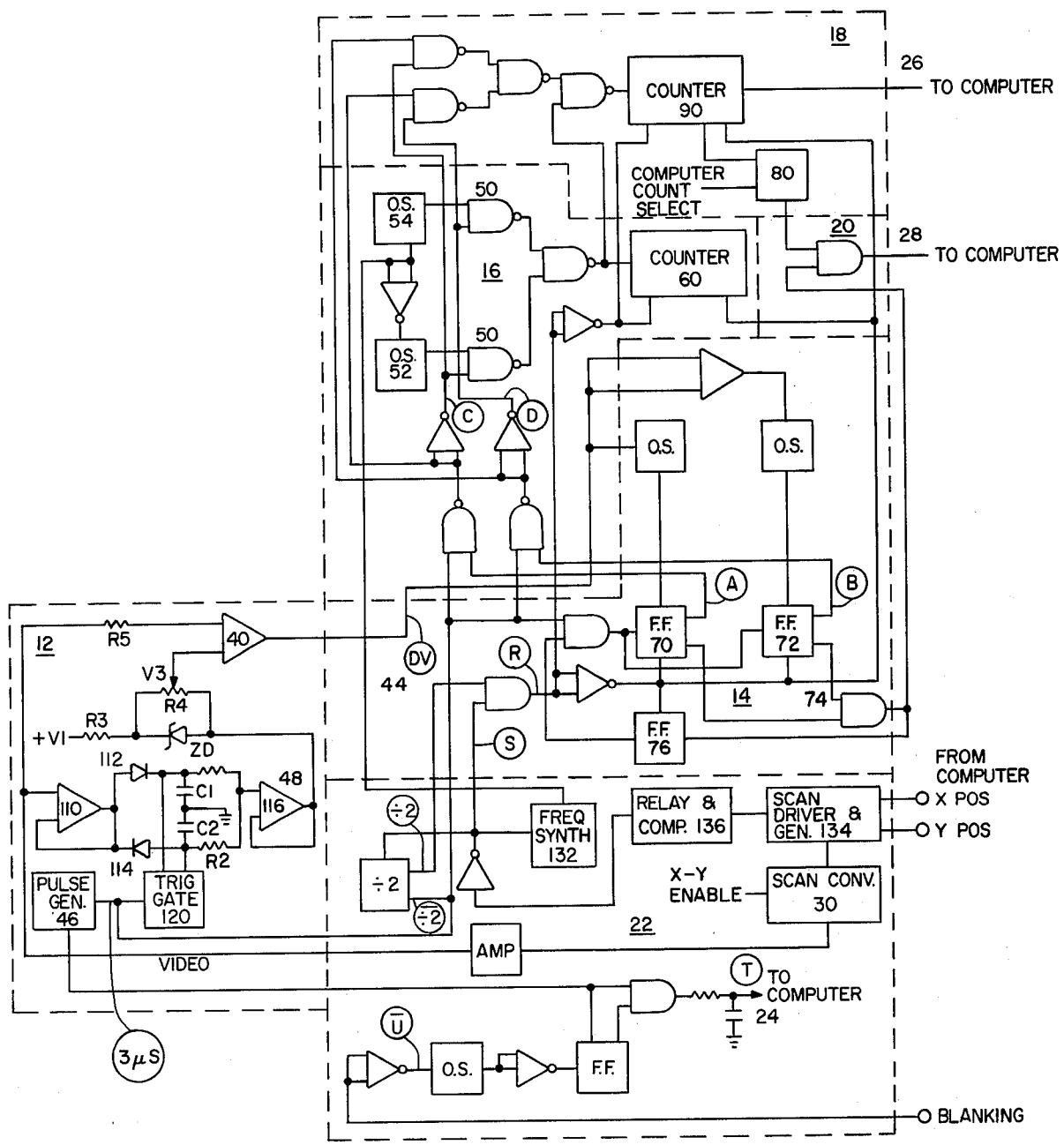
FIG. 2 is a schematic diagram, partially in block form of a preferred embodiment of the present invention.

In the circuit of FIG. 2 certain functions must be implemented so that the pulse video can be used to determine the angle of the edge with respect to a circle scan starting point. First, a digitized video is needed, since this will give a very sharply defined position of the contrast edge. Further, such digitization is needed to drive TTL gating functions. Digitization is accomplished by CMR 12. Secondly, the angle thus determined must be digitized and presented to the computer. Thirdly, any video which has more than two edges during a circular scan must be rejected as containing more than one contrast edge, or having noise. And, finally, only the more reliable information available from a contrast edge within the center portion of the circle is retained. That is, edges appearing near the perimeter of the scan are rejected.

The output of scan convertor 30 may be processed as follows, as shown by FIG. 2; Assuming the computer has just read the information from position X1-Y1, and assuming that four circular revolutions are scanned at each discrete position, the computer would be programmed to provide a blanking pulse during the first of the four scans to initiate certain actions in timing circuitry 22. The computer also changes the deflection voltage to position X2, Y1. During the second circular scan, the video is generated from position X2, Y1, but not processed. At the start of the third scan, timing circuitry 22 initiates CMR 12 so that it produces a bias voltage which is equal to the average value between the most negative excursion of the video produced during the third scan and the most positive excursion. During the fourth scan, the bias is fed into digital comparator 40 along with the video, and a digitized output ensues.

The second function of deriving, or measuring, the angle of the contrast edge uses a X128 ("times 128") input from timing circuit 22 in conjunction with appropriate gates. These gates determine the number of X128 pulses gated to angle counter 16 as a function of when the digitized video edges occur. Counter 16 doubles X128 to 256 pulses per scan corresponding to 360° per circle. This is an 8 megaHertz counting rate that amounts to 1.4° per pulse. At the start of the fourth circular scan, angle counter 16 is counting at its maximum rate of 8 megaHertz, beginning from 0. When the first video edge occurs, gate 50 blocks half the incoming angle counter pulses. And, counting continues at a 4 megaHertz rate. When the second edge occurs, the other half of the pulses are blocked and counting stops. The numeral count output of counter 60 represents the angle of the contrast edge.

It does not matter whether the video started as light or dark, since the edges can be either polarity. In addition, only a count of 128 is required to identify the edge angle since 128 corresponds to 180° and any edge rotated 180° has simply changed polarity. So the result in a system where the scan is initiated at the right hand edge of the circle, is that a horizontal edge results in a angle of 90°, or a count of 64. If the edge is rotated to a vertical orientation, the angle increases to 180° or a count of 128.

The gates which feed angle counter 16 are controlled by transitions of the contrast edge. If a third transition occurs within one of the scans, the state of one of the two gates changes again, generating an indicator that the information processed is invalid. That is, three transitions during one revolution are not indicative of a single contrast edge. The circuit of FIG. 2 latches the gate that has been changed by the third transition in its position until reset to the nest X1, Y position. Angle counter 16 will count, but it's false information will be rejected by the computer.

The last function performed by the circuit is to gate and count the number of 4-MHz pulses between the two transitions of the contrast edge. If the count is greater than a preselected amount, the contrast edge is too close to the right edge of the scan circle. If the count is less than a second preselected amount, the contrast edge is too close to another edge of the circle. Duty cycle gate 18 decodes the count and puts out an indicator of invalidity for either condition. By incorporating several decoders within duty cycle gate 18, a choice of gate widths is permitted.

At the end of each fourth scan at any one discrete position, the computer receivers a "start read" command at output 24 to read the angle at output 26 and validity bit at output 28. Thereafter, the scan is moved to a new position and the process repeated until the full image has been investigated in a raster pattern. The "start read" command, or flag, is generated by pulse generator 46 of CMR 12 and also notifies the computer that a new raster position is required.

As a primary of the present invention, the absolute intensity of the video is removed through CMR 12 so that it can be possible to process contrast edges that have a lesser magnitude than full light to total dark, or vice versa. A threshold can be adjusted to set the minimum contrast level that will be detected.

The functions performed by the present invention are: (1) determines that a contrast edge exists, even where the contrast is less than full scale, (2) calculate the angle of the edge, (3) determine that only one distinct edge exists, (4) give the same angular reading up to numerial 180° regardless of orientation of dark to light across the transistion, (5) provide an adjustable contrast threshold, and (6) accept only edges near the center of the circular scan.

Functions (1) and (5) are performed by CMR 12. Angle counter 16 performs (2) and (4). Validity circuit 14 performs (3). And, function (6) is performed by duty cycle gate 18.

A circular scan passing over a contrast edge produces a video square wave type of pattern whose amplitude depends on the contrast and whose duty cycle (percent of light to dark) depends on how close to the center point of the scan that the edge is. If the mid value of the two levels (maximum and minimum level of the video) is fed into one side of a difference amplifier, and the video into the other, an output centered around ground will always result, and further processing will be simplified. The above will be true even when the amplitude (contrast) is small. CMR 12 performs this task by peak detecting the most positive (light) voltage and the least positive (darkest) voltage occurring during one circular scan at point 42. The average of the two at point 46 becomes the common mode voltage which is fed into difference amplifier 40 along with the actual video. Thus, whether the scan is predominately light or dark, only the contrast difference comes out of CMR 12, centered around ground. Difference amplifier 40 is a voltage comparator for digitizing. Reference voltage $V_3$ is a threshold more positive than the common mode voltage, and is high enough that small contrasts are gated out. The number of edges accepted can thus be controlled.

Digitized output 44 from CMR 12 is a square wave pattern per circular scan with sharp rise and fall times, and is suitable for driving TTL circuitry. The angle determining circuit which it drives via validity circuit 14 is a gated counter circuit, angle counter 16. At the start of a circular scan with the example hardware shown in FIG. 2, 256 pulses per scan period, derived in one-shots 52 and 54 and × 128 inch frequency synthesizer 132, are being counted. The scan may be at an 8 megahertz rate with a 32 microsecond (or 30 kilhertz) period. The first digitized edge results in gating out one-half the pulses by gate 50. Thereafter, 128 pulses per period (4 MHz) are being counted. When the second edge occurs, the remaining half of the input pulses is gated out at gate 50, and counter 60 holds till the computer has read the static value of the number of pulses that were counted. A count of 255 pulses represents a 360° scan. The number of pulses actually counted give an angle in proportion to the full circle.

Since it is immaterial whether the dark part of the circle is to the left or right, or up or down, the counter can be made to count up to 128 two times during one scan without losing information. This is accomplished by dropping the most significant bit that is, the circuit can read edges with rotations up to 180°, and if the edge continues rotation, the counter starts again at 0° and goes up to 180°. The difference between the first stated 0° and second 0° is only that the part of the scan which was light is now dark, and vice versa. The angle is correct. Thus functions (2 and 4) are performed by angle counter 16.

Two-edge validity circuit 14 rejects the angle information if more than two edges occur during one scan. As stated earlier, each edge of the square wave from a circular scan generates a gate which blocks the pulses to the angle counter. Each digitized video edge triggers a flip-flop, flip-flop 70 or flip-flop 72, one being on the negative edge and the other on the positive edge. If only two edges occurred during the scan, the flip-flop states are such that a "valid" signal is gated through gate 74 to NAND 20. If a third edge occurs, either flip-flop 70 or flip-flop 72 will change state gain, giving an "invalid" output 28. The flip-flops will also go ino a latched state by the operation of flip-flop 76 and not respond to further edges. At the start of a new scan position, everything is reset by signal R.

Duty cycle gate 18 has as its function the rejection of edges too close to the perimeter of the circular scan. This is done to reject edges which are not as accurate as those near the middle. By gating through the 4 MHz pulses which occur between two valid edges, and counting them, the nearness of the edge to the perimeter can be measured. If there are too few pulses, or too many, the contrast edge is near the perimeter of the scan circle. For example, if 64 are counted, it means that the contrast edge split the scan circle. This is consistent with 4 pulses per microsecond for 16 microseconds (one-half scan period). Decoding gates 80 may be made to select counts of 48 to 79, or 32 to 95, or 16 to 111, through computer or manual selection, for example, and give a "valid" indication through NAND gate 20 if the count is within these limits. Counts from 0 to 15 and 112 to 127, then would always give an invalid indication.

Thus, if the video derived from the circular scan passes the criteria laid down by the hardware, a "valid" indicator is generated for the computer which directs the appropriately programmed computer to read the digitized angle from the hardware output 26 and store the raster position at which the valid edge was directed. The position, since it is controlled by the computer, is an internal storing operation.

Timing circuit 22 is included to provide conversion of a video image into scan data, and provide proper timing and commands to the circuitry shown.

The following list of components is offered merely as an example only of an operative embodiment of the present invention in accordance with the circuitry of FIG. 2. The present invention is not limited to the precise embodiment shown but is intended to encompass the technique disclosed herein. Representative components are:

| SYMBOL | COMPONENT | TYPE OR VALUE |
| --- | --- | --- |
| 110 | Op Amp | LM 318 |
| 112, 114 | Diode | 1N914 |
| 116 | Op Amp | NH0022C |
| 40 | Comparator | LM 211 |
| 46 | Pulse generator | 9601 |
| 120 | Triggered Gate | AH0133CD |
| $V_1$ | Voltage Source | + 15 Volts |
| ZD | Zener Diode | IN747A(3.6V) |
| C1, C2 | capacitor | 0.001 μf |
| R1, R2 | Resistor | 200 K |
| R3 | Resistor | 5.1 K |
| R4 | Variable Resistor | 10 K |
| R5 | Resistor | 2 K |
| R13 | Resistor | 51 OHM |
| 132 | Frequency Synthesizer | MC4018, MC4024, MC4094, SN7473 |
| 134 | Scan Driver & Generator | Sine-Cosine Generator using 2 ea. LM318 |
| 36 | Delay & Comparator | Standard Sine Wave Phase Shifter and NA710 |
| 60, 90 | Counter | SN7473 |

Figure 3:
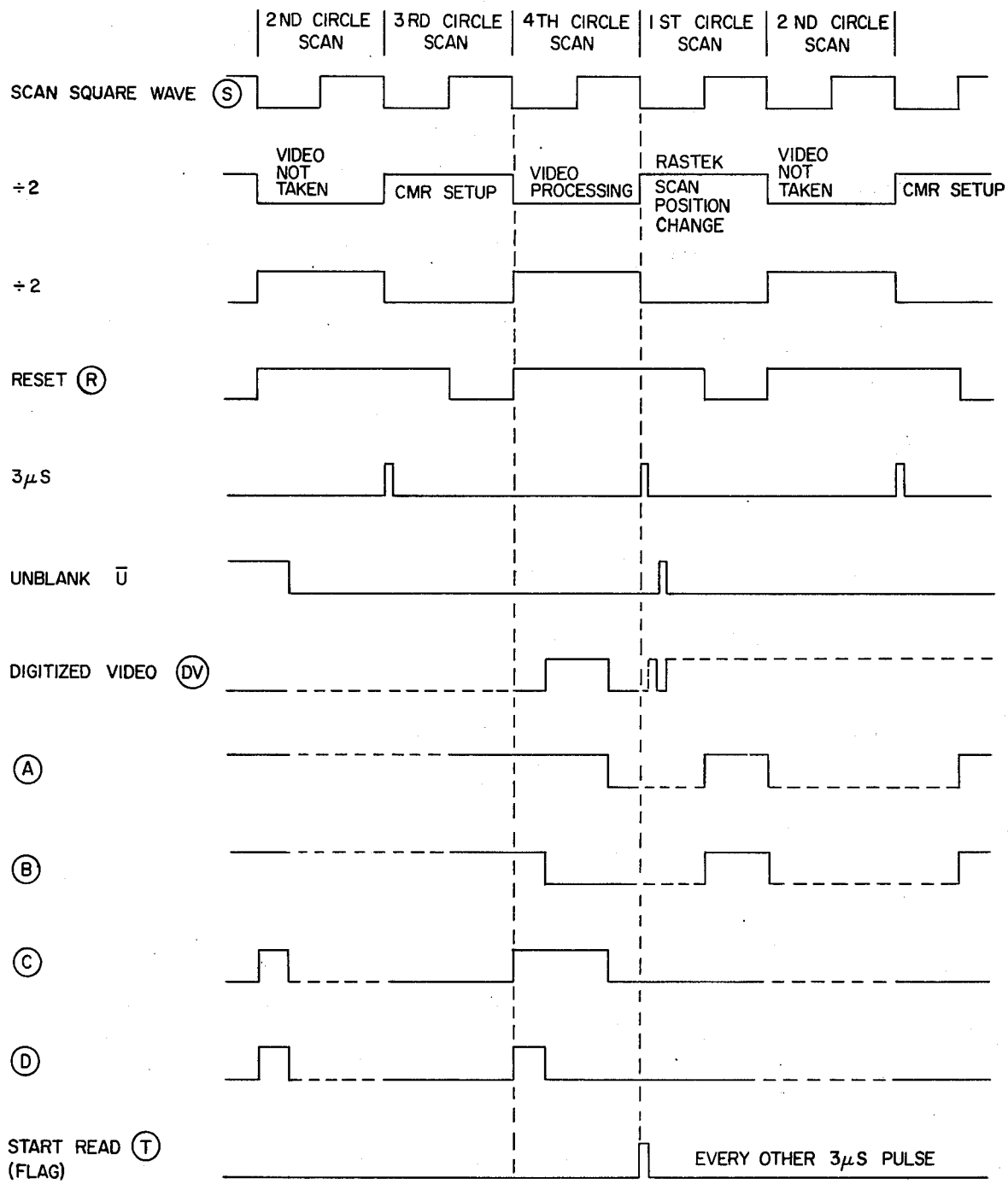
FIG. 3 is a waveform diagram of representative waveforms appearing within the circuit of FIG. 2.

FIG. 3 shows typical waveforms at representative points within the circuitry of FIG. 2. They are included to facilitate the reader's understanding of the embodiment described.

To those skilled in the art it will be obvious upon a study of this disclosure that the present invention presents a variety of modifications and hence can be given embodiments other than those particularly illustrated and described herein, without departing from the essential features of the invention and within the scope of the claims annexed hereto.

What is claimed is:

1. Apparatus to be coupled to a source of video signals that are responsive to a field-of-interest, which will detect video contrast levels in the signals that correspond to contrast edges in the field-of-interest even though the contrast level may be less than full scale, and, further, which will measure the angle of the contrast edge, comprising:

circuit means for processing said signals to obtain said levels, and comparing the average of said levels with said signals to provide an output centered around zero level value that identifies the existence of at least one said contrast edge;

circuit means for rejecting said output when more than one side edge is identified during a preselected period;

electronic counting means for measuring the angle of said edge identified by an output that is not rejected by said rejecting means;

timing means coupled to said processing and comparing means, said rejecting means, and said measuring means for controlling the function of each in accordance with a timing sequence.

2. The apparatus of claim 1 wherein said processing circuit means includes means for digitizing said signals by electronically measuring the average value between the most positive excursion of each of said signals and the most negative excursion, and comparing said average to the signal.

3. The apparatus of claim 2 wherein said signals are stored in a scan converter such that said average can be determined prior to said comparison.

4. The apparatus of claim 3 wherein the tube of said scan converter is circularly scanned a plurality of times at each of a plurality of discrete positions in a raster pattern, and wherein said apparatus further comprises means for rejecting detected edges that occur within a preselected proximity to the perimeter of said circular scan.

5. The apparatus of claim 4 wherein said angle measuring counting means counts at a pre-established rate until said circular scan transistions a first said level, and then at one-half said pre-established rate until a second transistion occurs, at which time counting stops and the count attained defines the position of the normal to a line joining the transistion points, and thereby, the angular orientation of said line with respect to a reference.

* * * * *